(12) United States Patent
Jacobsen et al.

(10) Patent No.: US 7,321,614 B2
(45) Date of Patent: Jan. 22, 2008

(54) APPARATUS AND METHODS FOR COMMUNICATING USING SYMBOL-MODULATED SUBCARRIERS

(75) Inventors: Eric A. Jacobsen, Scottsdale, AZ (US); Adrian P Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 10/675,892

(22) Filed: Sep. 29, 2003

(65) Prior Publication Data

US 2005/0068916 A1 Mar. 31, 2005

Related U.S. Application Data

(60) Provisional application No. 60/493,937, filed on Aug. 8, 2003.

(51) Int. Cl.
*H04B 1/38* (2006.01)
(52) U.S. Cl. ..................................................... 375/221
(58) Field of Classification Search ................ 375/224, 375/225, 228, 295, 221, 219, 140, 146, 147; 341/173; 455/17, 7, 39, 59, 91, 102, 126, 455/127.1, 127.2, 115.1, 115.3, 115.4; 322/185; 340/870.18, 870.01; 370/203, 204, 241, 370/310, 431, 464, 527, 522, 498, 208
See application file for complete search history.

(56) References Cited

U.S. PATENT DOCUMENTS 5,479,447 A 12/1995 Chow et al.
5,668,810 A * 9/1997 Cannella, Jr. ............... 370/392
6,061,405 A 5/2000 Emami
6,178,158 B1 1/2001 Suzuki et al. ............... 370/203
6,192,026 B1 2/2001 Pollack et al. .............. 370/203
6,249,543 B1 6/2001 Chow ......................... 375/219
6,748,212 B2 6/2004 Schmutz et al.
6,795,424 B1 9/2004 Kapoor et al.
6,891,858 B1 5/2005 Mahesh et al.

(Continued)

FOREIGN PATENT DOCUMENTS

WO WO-97/41675 A1 11/1997

(Continued)

OTHER PUBLICATIONS

Bangerter, Boyd, et al., "High-Throughput Wireless LAN Air Interface", *Intel Technology Journal: Wireless Technologies*, vol. 7, Issue 3, Available at http://developer.intel.com/technology/itj/index.htm, (Aug. 19, 2003), pp. 47-57.

(Continued)

*Primary Examiner*—Pankaj Kumar
(74) *Attorney, Agent, or Firm*—Schwegman, Lundberg & Woessner, P.A.; Gregory J. Gorrie

(57) ABSTRACT

Apparatus and methods for selecting a transmit power level and subcarrier modulation assignments based on measured channel conditions to achieve a performance level for communications over a symbol-modulated subcarrier communication channel are provided. In some embodiments, the transmit power level may be changed depending on whether a desired packet error rate and/or a desired link data rate can be achieved based on selected subcarrier modulation assignments and a selected transmit power level.

25 Claims, 4 Drawing Sheets

U.S. PATENT DOCUMENTS

| | | | |
|---|---|---|---|
| 7,020,212 | B1 | 3/2006 | Strait |
| 7,120,198 | B1* | 10/2006 | Dafesh et al. ............... 375/261 |
| 7,124,193 | B1* | 10/2006 | Leung et al. ............... 709/231 |
| 7,177,369 | B2* | 2/2007 | Crilly, Jr. .................... 375/296 |
| 2001/0055952 | A1 | 12/2001 | Ficarra |
| 2002/0122383 | A1 | 9/2002 | Wu et al. |
| 2002/0126694 | A1 | 9/2002 | Kahola |
| 2002/0163495 | A1* | 11/2002 | Doynov .................... 345/156 |
| 2003/0119534 | A1 | 6/2003 | Kostic et al. |
| 2004/0018843 | A1 | 1/2004 | Cerwall et al. |
| 2005/0265281 | A1 | 12/2005 | Ketchum |
| 2005/0276344 | A1 | 12/2005 | Ling et al. |
| 2006/0039312 | A1 | 2/2006 | Walton et al. |
| 2006/0050623 | A1 | 3/2006 | Hartman, Jr. |
| 2006/0067278 | A1 | 3/2006 | Li et al. |
| 2006/0087972 | A1 | 4/2006 | Jalali et al. |

FOREIGN PATENT DOCUMENTS

| | | |
|---|---|---|
| WO | WO-2005/015769 A2 | 2/2005 |

OTHER PUBLICATIONS

Bansal, Prateek, et al., "Adaptive Loading in MIMO/OFDM Systems", Dated Dec. 13, 2001, Available on the internet Sep. 2003, pp. 1-12.

Ergen, Mustafa, et al., "QoS Aware Adaptive Subcarrier Allocation in OFDMA Systems", University of California Berkeley, Available on the internet Sep. 2003, 26 pages.

International Search Report for corresponding PCT Application No. PCT/US2004/025432 (Feb. 14, 2005), 4 pgs.

Fischer, R. F., et al., "A New Loading Algorithm for Discrete Multitone Transmission", *Global Telecommunications Conference, 1996. Globecom '96. 'Communications: The Key to Global Prosperity* London, UK 18-22, vol. 1, (Nov. 18, 1996),724-728.

Jarot, S. P., et al., "Each Carrier Transmission Power Control with Antenna Carrier Diversity for OFDM/DS-CDMA System", *Telecommunications, Eurel Publication*, vol. 11 (6), Milano, IT.,(Nov. 1, 2000), 539-546.

* cited by examiner

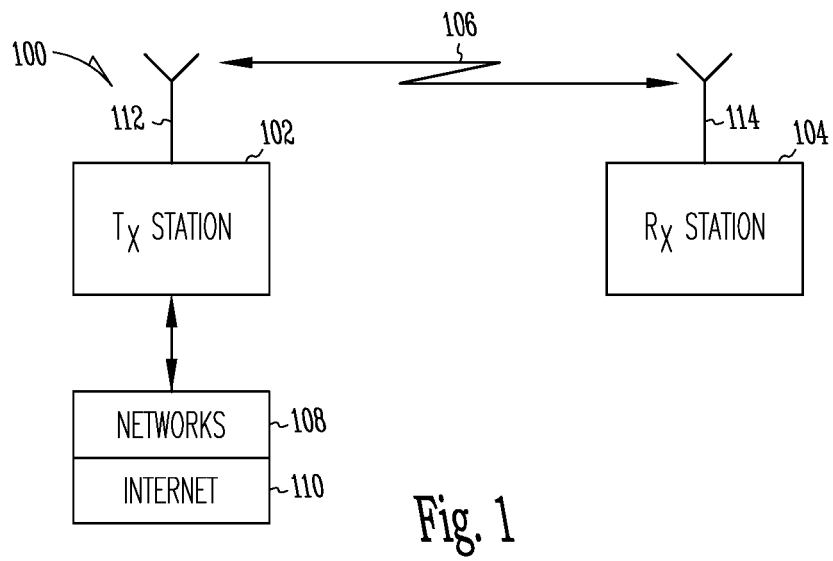
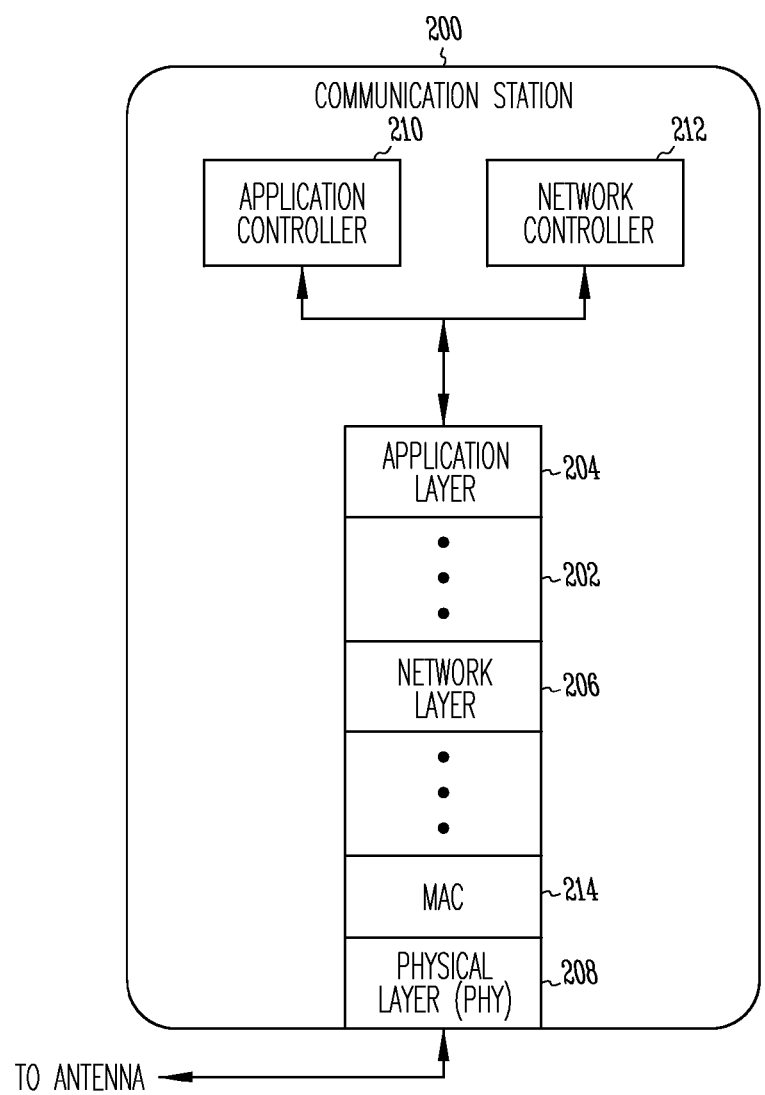

APPARATUS AND METHODS FOR COMMUNICATING USING SYMBOL-MODULATED SUBCARRIERS

This application claims the benefit of U.S. Provisional Patent Application Ser. No. 60/493,937, filed on Aug. 8, 2003.

TECHNICAL FIELD

Embodiments of the present invention pertain to electronic communications, and in particular, to wireless communications, and in some embodiments, to wireless communications using symbol-modulated subcarriers.

BACKGROUND

Some wireless local area networks employ multi-carrier transmission techniques, such as orthogonal frequency division multiplexing, in which symbol-modulated orthogonal subcarriers are used to transmit information. The use of orthogonal subcarriers allow the subcarriers to be spaced much more closely together within an available spectrum than, for example, the individual channels in a conventional frequency division multiplexing (FDM) system. Before transmission, the subcarriers may be modulated with a low-rate data stream. The transmitted symbol rate of the symbols may be low, and thus the transmitted signal may be highly tolerant to multipath delay spread within the channel. For this reason, many modem digital communication systems are using symbol-modulated orthogonal subcarriers as a modulation scheme to help signals survive in environments having multipath reflections and/or strong interference.

Many conventional communication systems achieve higher throughput by operating at a maximum transmit power level. These systems, however, do not consider the effects that transmit power level may have on other communication devices. Furthermore, these systems do not consider network information, the data type and the application for determining transmit power lever, as well as other communication parameters for communicating.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIG. 1 illustrates a communication system in accordance with some embodiments of the present invention;

FIG. 2 is a functional block diagram of a communication station in accordance with some embodiments of the present invention;

DETAILED DESCRIPTION

Figure 3:
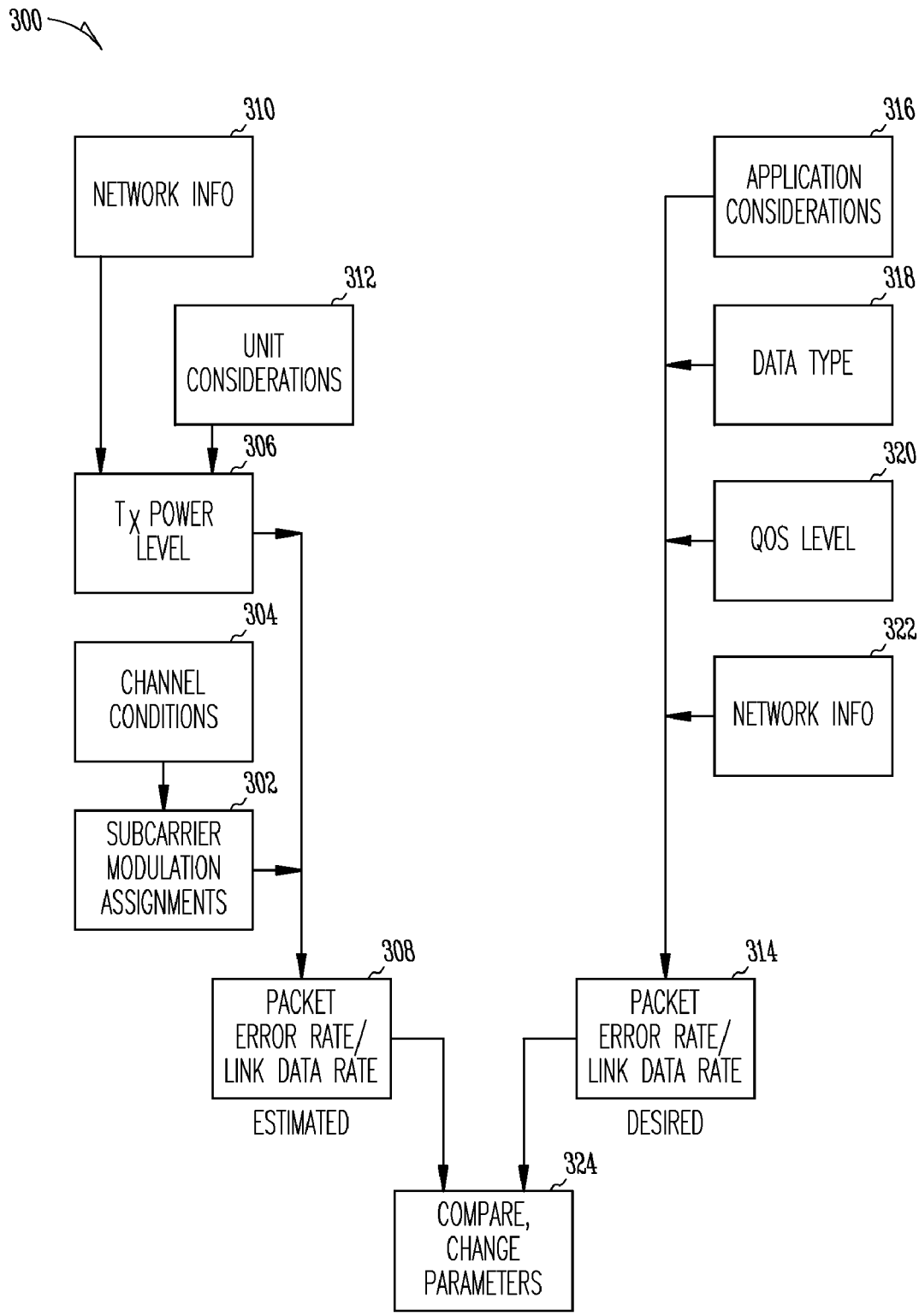
FIG. 3 is an information flow diagram in accordance with some embodiments of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

FIG. 1 illustrates a communication system in accordance with some embodiments of the present invention. Communication system 100 may include transmitting station 102 and receiving station 104, which may communicate over communication channel 106. Communication channel 106 may comprise a plurality of orthogonal symbol modulated subcarriers. System 100 may be part of a high-throughput (HT) wireless local area network (WLAN) which utilizes adaptive bit loading and transmit power control for communication channels that utilize symbol modulated subcarriers, although the scope of the invention is not limited in this respect. In some embodiments, the transmit power level and subcarrier modulation assignments may be selected and updated based on measured channel conditions to achieve a quality of service (QOS) level for an application and data type. In some embodiments, the transmit power level and subcarrier modulation assignments may be selected to achieve an acceptable packet error rate and/or an acceptable link data rate, although the scope of the invention is not limited in this respect. In some embodiments, an acceptable packet error rate at the top of the communication station's physical layer (PHY) and an acceptable link data rate at the top of the communication station's MAC layer may be achieved.

In accordance with some embodiments, system 100 may use the observed or measured frequency selectivity and interference of channel 106 to select subcarrier modulation assignments for each subcarrier or groups of subcarriers. This may be referred to as adaptive bit loading (ABL). The subcarrier modulation assignment decisions may affect the overall achieved data rate depending on the modulation orders selected. System 100 may also utilize transmit power control (TPC) to adjust the transmit power. The transmit power level may be changed, for example, to reduce battery consumption and/or interference to other devices, or to support small "cell" sizes. Adjustment of the transmit power level on one end of channel 106 may affect the ABL modulation order decisions on the other end since each subcarrier's signal to noise ratio (SNR) may change with the transmit power level.

In some embodiments, a communication station, such as receiving station 104, may estimate channel 106 in order to select subcarrier modulation assignments via an ABL process. In these embodiments, receiving station 104 may also consider asking transmitting station 102 to change its transmit power level. In some situations, when the ABL process determines that low modulation levels are desired for reliable communications at the current transmit power level, the data rate may suffer accordingly. Although receiving station 104 may request that transmitting station 102 increase its power level, an increased power level may create unacceptable levels of interference with other communication stations and increase the power consumption of transmitting station 102. As can be seen, a tradeoff exists between throughput (i.e., link data rate), link reliability, transmitter power consumption, and interference to other devices. In accordance with some embodiments of the present invention, communication stations 102 and/or 104 may select a transmit power level and may select subcarrier modulation assignments by considering parameters not directly related to the communication link. Examples of such parameters may include the data type, the application and/or application requirements, network congestion, network aggregate throughput, and/or latency requirements.

In some embodiments, receiving station 104 may be a mobile communication unit, while transmitting station 102 may be a more stationary communication unit such as an access point. In these embodiments, transmitting station 102 may be coupled with one or more external networks 108 and/or the Internet 110. The terms "transmitting" and "receiving" are applied to transmitting station 102 and receiving station 104 for ease in understanding embodiments of the present invention. It shall be understood that both stations may include both transmitting and receiving capability to establish duplex communications therebetween. Furthermore, although some embodiments of the present invention are described with respect to point-to-multipoint communications, the scope of the present invention is equally applicable to peer-to-peer communications.

Receiving station 104 and transmitting station 102 may be almost any wireless communication device including a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly. In some embodiments, stations 102 and 104 may transmit and/or receive RF communications in accordance with specific communication standards, such as the IEEE 802.11 standards and/or the IEEE 802.16 standards for wireless local area network standards, although stations 102 and 104 may also be suitable to transmit and/or receive communications in accordance with other techniques including the Digital Video Broadcasting Terrestrial (DVB-T) broadcasting standard, and the High performance radio Local Area Network (HiperLAN) standard.

Antennas 112 and 114 may comprise a directional or omnidirectional antenna, including, for example, a dipole antenna, a monopole antenna, a loop antenna, a microstrip antenna or other type of antenna suitable for reception and/or transmission of RF signals. In some embodiments, antenna 112 and/or antenna 113 may be a smart antenna which may allow a reduction in transmit power level to achieve a similar packet error rate or link data rate. In some embodiments, the smart antenna may also affect the SNR. By changing the directivity of a smart antenna on a transmitting station, the resulting channel may look less frequency selective to the receiver resulting in possibly a different selection of subcarrier modulation assignments. As a result, the ABL behavior changes in the presence of a smart antenna. In some embodiments, a smart antenna may be controlled by an algorithm that may or may not be coupled with the communication parameter selection processes described herein. In the embodiments that include a smart antenna, the smart antenna parameters may be set prior to channel measurements to allow subcarrier modulation assignments and transmit power level selection for a less-frequency selective channel. In some embodiments, a smart antenna may comprise a combination of two or more antennas which result in the ability to change the radiation pattern of a communication station to improve SNR, increase gain and/or directivity by beamforming, and/or zero forcing to help avoid interferers.

FIG. 2 is a functional block diagram of a communication station in accordance with some embodiments of the present invention. Communication station 200 may be suitable for use as transmitting station 102 and/or receiving station 104 (FIG. 1) although other communication devices may also be suitable. Communication station 200 may comprise protocol stack 202, which may include one or more layers, such as application layer 204, network layer 206, medium access control (MAC) layer 214, and physical layer (PHY) 208. Layer 208 may couple with an antenna such as antenna 112 or 114 (FIG. 1). Communication station 200 may also comprise a controller to coordinate the activity of the various elements of station 200 and protocol stack 202.

Communication station 200 may also include application controller 210 and/or network controller 212. Application controller 210 may determine the performance level based on an application and data type. In some embodiments, network controller 212 may influence the selection of a transmit power level and subcarrier modulation assignments made by physical layer 208 based on channel conditions to achieve a certain performance level. In influencing the selections made by physical layer 208, network controller 212 may take into account network information discussed in more detail below. This is described in more detail below.

In some embodiments, physical layer 208 may be associated with a receiver and signal processing elements for receiving symbol modulated subcarrier communication signals and providing data signals. Physical layer 208 may also be associated with a transmitter and signal processing elements for converting data signals for transmission on symbol modulated subcarrier communication channels. For example, in some embodiments, station 200 may include an orthogonal frequency division multiplex (OFDM) receiver and an OFDM transmitter associated with physical layer 208.

In some embodiments, physical layer 208 may select subcarrier modulation rates and transmit power levels. In some embodiments, a controller, such as network controller 212, may influence the selection of modulation rates for the subcarriers on a per subcarrier basis. Forward error correction (FEC) code rates and interleaving may be adjusted to the per subcarrier modulation selections. Some examples of selecting modulation assignments for subcarriers are discussed in U.S. patent application Ser. No. 10/122,513, entitled "WIRELESS DEVICE AND METHOD FOR INTERFERENCE AND CHANNEL ADAPTATION IN AN OFDM COMMUNICATION SYSTEM", which is assigned to the same assignee as the present application.

Although station 200 is illustrated as having several separate functional elements, one or more of the functional elements may be combined and may be implemented by combinations of software-configured elements, such as processing elements including digital signal processors (DSPs), and/or other hardware elements. For example, the controllers may comprise one or more microprocessors, DSPs, application specific integrated circuits (ASICs), and combinations of various hardware and logic circuitry for performing at least the functions described herein. Although MAC layer 214 is illustrated as being next to physical layer 208, nothing requires this. In some embodiments, MAC layer 214 may be situated above physical layer 208.

FIG. 3 is an information flow diagram in accordance with some embodiments of the present invention. Some elements illustrated in diagram 300 may be provided by a transmitting station such as transmitting station 102 (FIG. 1), and some elements may be provided by a receiving station, such as receiving station 104 (FIG. 1) although other communication stations may also be suitable.

In accordance with some embodiments, subcarrier modulation assignments 302 may be selected based on channel conditions 304, which may be measured by a receiving station. Subcarrier modulation assignments 302 along with transmit power level 306 may determine the possible packet error rate and/or link data rates 308 that are achievable for a particular channel. In some embodiments, a receiving station may determine the possible packet error rate and/or link data rates 308 based on channel conditions 304 and transmit power level 306. In some embodiments unit considerations 312 may restrict or limit the transmit power levels available for communications through the channel. In some embodiments, a network controller a receiving station may determine packet error rates and/or link data rate 308, although the scope of the invention is not limited in this respect.

Desired packet error rate and/or link data rate 314 may be determined by a receiving station. In some embodiments, desired packet error rate and/or link data rate 314 may be based on application type 316, data type 318, quality of service level 320 and/or and network information 322. An application controller of a receiving station, in conjunction with the application layer, may determine desired packet error rate and/or link data rate 314, although the scope of the invention is not limited in this respect. In some embodiments, the application controller may determine packet error rate and link data rate combinations that are acceptable to the receiving station based on data type 318, application considerations 316 and/or QOS level 320.

Application considerations 316 may include a minimum or target packet error rate and/or minimum data rate for a particular application that may be operating on a communication station. Application considerations 316 may also include a performance level or quality of service level for the application. In some cases, application considerations 316 may include a minimum fragment size for the application, a maximum fragment size, and latency considerations.

Data type 318 may include the type of data which is being communicated or being used by an application running on a communication unit. Examples of data types include voice data, audio data, video data, gaming data, internet protocol data, file transfer data, and email data. Each data type may have a desired packet error rate and/or a data rate associated with it, which in some cases, may depend on the application using the data. Data types may also have associated latency requirements.

Network information 310 and 322 may include network congestion and network aggregate throughput, as well as other network limitations and throughput. Network information 310 and 322 may affect the packet error rate and/or the link data rate. In some cases the network controller may manage overall service to several communication stations rather than service to one station over an individual link. For example, the network controller may wish to make sure that the several communication stations receive about the same link performance. Alternatively, the network controller may select communication parameters so that some communication stations receive a minimum bandwidth or additional bandwidth, which may come at the expense of other stations. In these situations, the network controller may select an individual link to get slightly poorer throughput than it could in order to make sure that one or more other stations get adequate service. In other situations, the network controller may make individual link decisions based on interference levels to other network cells to manage overall network performance rather than making individual link decisions based solely on the individual link.

When a carrier sense multiple access with collision avoidance (CSMA/CA) channel access method is employed, there may be little or no benefit in optimizing for a low packet error rate because a high packet error rate may result from collisions. In this case, some embodiments of the present invention may optimize throughput by aiming for a higher packet error rate with a higher raw throughput. On the other hand, when packet loss is low (e.g., either due to collision some other mechanism) and network load is high, the delay for retries may be undesirable, and therefore the network controller may emphasize a low packet error rate at the expense of raw throughput when the application traffic is known to be delay sensitive. Where there is a low network load, the network controller may recommend a reduction in transmit power to reduce interference to neighbor networks.

Unit considerations 312 may include power level adjustment capability of the transmitter, the power levels available across the subcarriers, the modulation levels and modulation parameters available on a per subcarrier basis, and power consumption limitations of the transmitting station. Channel conditions 304 may include the channel response including the frequency response, frequency selectivity and/or fading of the channel. Channel conditions 304 may also include potential interference with other communications in overlapping, nearby or adjacent channels, that may result, for example, when transmit power is changed. In some embodiments, channel conditions 304, application considerations 316, data type 318 and/or network information 322 may be known to a receiving station, while network information 310 and/or unit considerations 312 may be known to a transmitting station. In these embodiments, the combination of this information may be used by either a transmitting or receiving station to make transmit power level decisions as well as ABL decisions.

In some embodiments, desired packet error rate and/or link data rate 314 may be compared as part of element 324 with estimated packet error rate and/or link data rate 308 to determine whether the transmit power should be considered to be changed. In some embodiments, the receiving station may notify the transmitting station of the selection of subcarrier modulation assignments, as well as the selection of transmit power level. In some embodiments, the packet error rates and/or link data rate may be varied depending on the application, data type, and/or QOS level, rather than increasing the transmit power level. In some embodiments, the transmitting station may refrain from increasing the transmit power depending on possible interference with other devices. Examples of procedures performed by transmitting and receiving stations are described in more detail below.

In reference to FIGS. 1-4, some embodiments of the present invention provide a method for determining communication parameters. The method may include selecting transmit power level and subcarrier modulation assignments based on measured channel conditions to achieve a performance level for communications over a symbol-modulated subcarrier communication channel. The communication channel may comprise a plurality of individual orthogonal symbol-modulated subcarriers. The modulation rates may be selected for the individual subcarriers based on the measured channel conditions. One example of measured channel conditions may be the signal to noise and interference power ratio (SNIR) which may comprise the measured signal power divided by the sum of the received noise and the interference power.

In some embodiments, selecting the subcarrier modulation assignments may include selecting no modulation, BPSK modulation, QPSK modulation, 8-PSK modulation, 16-QAM, 32-QAM, 64-QAM, 128-QAM and/or 256-QAM for the individual subcarriers of the communication channel. Other individual subcarrier modulation assignments with more bits per symbol may also be suitable. In some embodiments, individual subcarriers having a better channel response (e.g., a higher SNR) may be assigned higher-order modulation assignments (e.g., having more bits per symbol) and subcarriers having a poorer channel response (e.g., a lower SNR) may be assigned lower-order modulation assignments (e.g., having fewer bits per symbol).

In some embodiments, a desired packet error rate and/or a desired link data rate may be determined based on a performance level desired for an application and/or a data type. Whether to change the transmit power level for subsequent communications over the communication channel may be determined depending on whether the desired packet error rate and/or the desired link data rate can be achieved based on the selected subcarrier modulation assignments and the selected transmit power level.

In some embodiments, an estimated packet error rate and an estimated link data rate may be generated for the channel based on the selected subcarrier modulation assignments and the transmit power level. A decision to change the transmit power level may be based on a comparison between the estimated packet error rate and/or link data rate, and the desired packet error rate and/or the desired link data rate.

In some embodiments, the desired packet error rate and the desired link data rate may be based on particular data type 318. Data type 318 may comprise voice, audio, video, gaming, internet protocol, file transfer and/or email data. For example, in the case of voice data, a moderate packet error rate and lower link data rate with a low delay limit may be desirable. For example, in the case of audio and video data, a lower packet error rate and higher link data rate may be desirable, depending on QOS level 320 which may be desired. For example, in the case of gaming data, a lower packet error rate and higher link data rate may be desirable. For example, in the case of internet protocol data, a lower packet error rate and higher link data rate may be desirable. For example, in the case of file transfer data and email data, a lower packet error rate may be desirable and a lower link data rate may be acceptable. The packet error rate and link data rate may depend on QOS levels which may be preselected for applications and/or data types. In some embodiments, determining a desired packet error rate and/or desired link data rate may be based on a desired quality of service level for the application using data of the data type.

In embodiments, QOS parameters may comprise a combination of packet error rate, delay limit and throughput. The packet error rate may be within the physical layer and may affect both link throughput (e.g., effectively the raw throughput multiplied by one minus the packet error rate) and the delay (e.g., the number of retries require to achieve reliable transport), or the residual data unit loss rate (e.g., a packet error rate at the top of the MAC layer). In the case of more time-critical data, such as voice, a lower packet error rate may be desirable to reduce retires. In the case of less time-critical data, such as internet traffic data, higher throughput at the top of the MAC layer may be more desirable, even though it may have a higher packet error rate.

In some embodiments, a transmit power level may be decreased to less than a maximum power level for an application that meets a predetermined quality of service level with a data type associated with a low data rate data or a high packet error rate. Communications may take place at the decreased transmit power level at either a lowered link data rate selected to substantially achieve the desired packet error rate, or at an increased packet error rate selected to substantially achieve the desired link data rate.

In some embodiments, channel conditions, such as interference that may be caused to another communication channel, may be measured and the transmitting station may refrain from increasing the transmit power level when an increased transmit power level would cause an unacceptable level of interference with other communication devices. Some embodiments may include increasing the transmit power level to achieve a decreased the packet error rate or an increased the link data rate to substantially meet a quality of service level for the application and the data type. Some embodiments may include refraining from increasing the transmit power level and either communicating at a lower link data rate selected to substantially achieve the desired packet error rate, or communicating at a reduced packet error rate selected to substantially achieve the desired link data rate.

In some embodiments, the subcarrier modulation assignments for the individual subcarriers may be selected based on a received signal, which may be a channel sounding preamble or some channel measurement signal. In these embodiments, data packets comprising data and training symbols modulated in accordance with the selected subcarrier modulation assignments may be subsequently communicated over the plurality of subcarriers. The data packets may be transmitted at the selected transmit power level.

In some embodiments, selecting the subcarrier modulation assignments and generating the estimated packet error rate and the estimated link data rate may be performed by a receiving station. The receiving station and/or a transmitting station may change the transmit power level based on the desired packet error rate and the desired link data rate.

In some embodiments, the transmitting station may refrain from increasing the transmit power level based network considerations, interference considerations or power consumption considerations. The transmitting station may reselect the subcarrier modulation assignments to achieve a quality of service level, and may communicate the re-selected subcarrier modulation assignments to the receiving station.

In some embodiments, throughput may be optimized at a fixed or predetermined transmit power level. In these embodiments, a communication signal may be transmitted at a predetermined transmit power level carrying a plurality of packets forming a burst of size equal to the number of packets. The signal may be received by a receiving station. For various packet error rates, the received signal may be evaluated for various subcarrier modulation assignments and fragment sizes to determine potential link data rates. The receiving station may select one of the potential subcarrier modulation assignments and a fragment size based on the potential link data rate to achieve the highest link data rate. The network layer packets are fragmented according to a fragment size and the fragments may be aggregated according to burst size. This allows fragments to be individually error-checked and possibly retransmitted.

In these embodiments, a communication signal may be transmitted at the predetermined transmit power level carrying packets at either a requested or a predetermined burst size, and the receiving station may evaluate various subcarrier modulation assignments and fragment sizes based on measured conditions of the communication channel. The receiving station may further estimate a duration of a data burst and a number of bytes expected to be received without error (e.g., the goodput) to determine an estimated link data rate. The goodput may be defined as the PHY throughput multiplied by one minus the packet error rate. The receiving station may also select a combination of packet error rate and fragment size to achieve a highest link data rate. In some embodiments, the receiving station may transmit the selected subcarrier modulation assignments, the selected fragment size and an expected packet error rate to a transmitting station, and subsequent communications may be received from the transmitting station in accordance with the selections.

Figure 4:
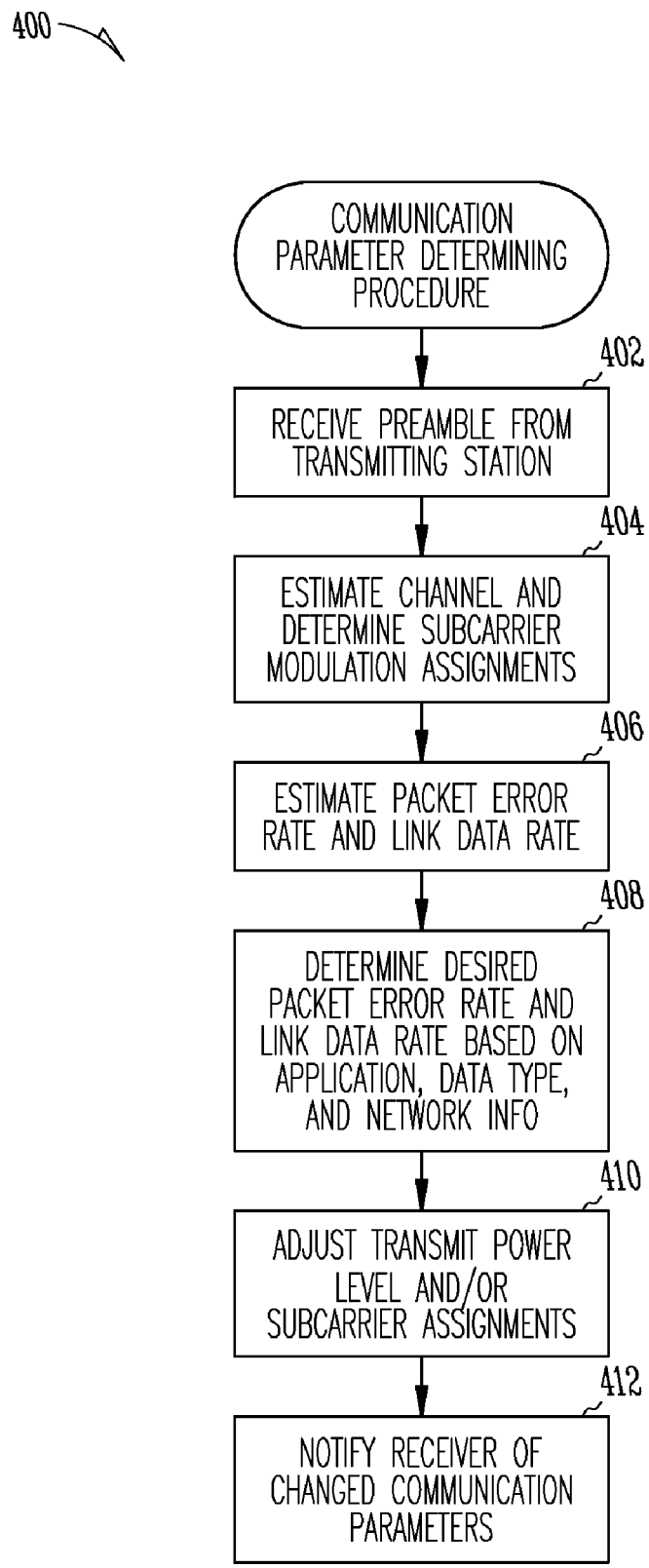
FIG. 4 is a flow chart of a procedure for determining communication parameters in accordance with some embodiments of the present invention.

FIG. 4 is a flow chart of a procedure for determining communication parameters in accordance with some embodiments of the present invention. Procedure 400 may be performed by one or more communication stations, such as communication stations 102 and 104 (FIG. 1) to determine communication parameters for communicating over a communication link using symbol-modulated subcarriers. The communication parameters may include the subcarrier modulation assignments for individual subcarriers, as well as a transmit power level. In addition to channel conditions, the communication parameters may be determined by considering interference to other devices, network information, application requirements, data type, battery and unit level considerations and/or a QOS level.

In operation 402, a receiving station may receive a communication signal, such as a channel-sounding preamble, from a transmitting station. In some embodiments, the communication signal may be a request to send (RTS) communication, although the scope of the invention is not limited in this respect.

In some embodiments, prior to receipt of the communication signal, the receiving and transmitting station may exchange capability information, which may be accomplished through a management frame exchange. This exchange may allow the receiving station to know the transmit power level adjustment capability of the transmitting station, along with subcarrier modulation assignment capability of the transmitting station. In some embodiments, the communication signal received in operation 402 may be transmitted carrying a requested packet error rate and/or link data rate for the requested transaction. The requested packet error rate and/or link data rate may be determined by the transmitting station's network controller based on information available to the transmitter, such as current data type and network information.

In operation 404, the receiving station may estimate the channel based on the signal received in operation 402 and may select subcarrier modulation assignments based on channel measurements for the received power level. In some embodiments, the receiving station may estimate the channel based on the signal received in operation 402 and may select subcarrier modulation assignments to meet a packet error rate and/or link data rate requested by the transmitter.

In operation 406, the receiving station may estimate a packet error rate and/or link data rate based on the selected subcarrier modulation assignments and the transmit power level.

In operation 408, a network controller may determine a desired packet error rate and/or link data rate. The desired packet error rate and/or link data rate may be determined based on application considerations, data type, and network information. In some embodiments, operation 408 may be performed by a transmitting station, and prior to performing operation 410, the receiving station may send the selected subcarrier modulation assignments and selected transmit power level selected in operation 406 to the transmitting station.

In some embodiments, the desired packet error rate and/or link data rate may be considered against unit considerations such as battery level, and network interference considerations. In operation 410, based on these consideration, the network controller may reselect the transmit power level and/or subcarrier modulation assignments resulting in a different packet error and/or link data rate.

In some embodiments in which the receiving station had requested a packet error rate and/or link data rate in operation 402, the receiving station may send the selected subcarrier modulation assignments and selected transmit power level selected in operation 406 to the transmitting station. In addition, the receiving station may notify the transmitting station as to whether or not it is able to meet the requested a packet error rate and/or link data rate with the selected subcarrier modulation assignments. When selected subcarrier modulation assignments are not able to meet the requested a packet error rate and/or link data rate, the transmitting station may decide to increase its transmit power level. When the selected subcarrier modulation assignments are able to meet the requested packet error rate and/or link data rate with sufficient margin, the transmitting station may decide to reduce its transmit power level.

In operation 412, the receiving station may be notified that the transmitting changed the communication parameters, such as a change in the transmit power level or a change in the subcarrier modulation assignments. Upon the completion of operation 412, the transmitting station may communication data to the receiving station.

Figure 5:
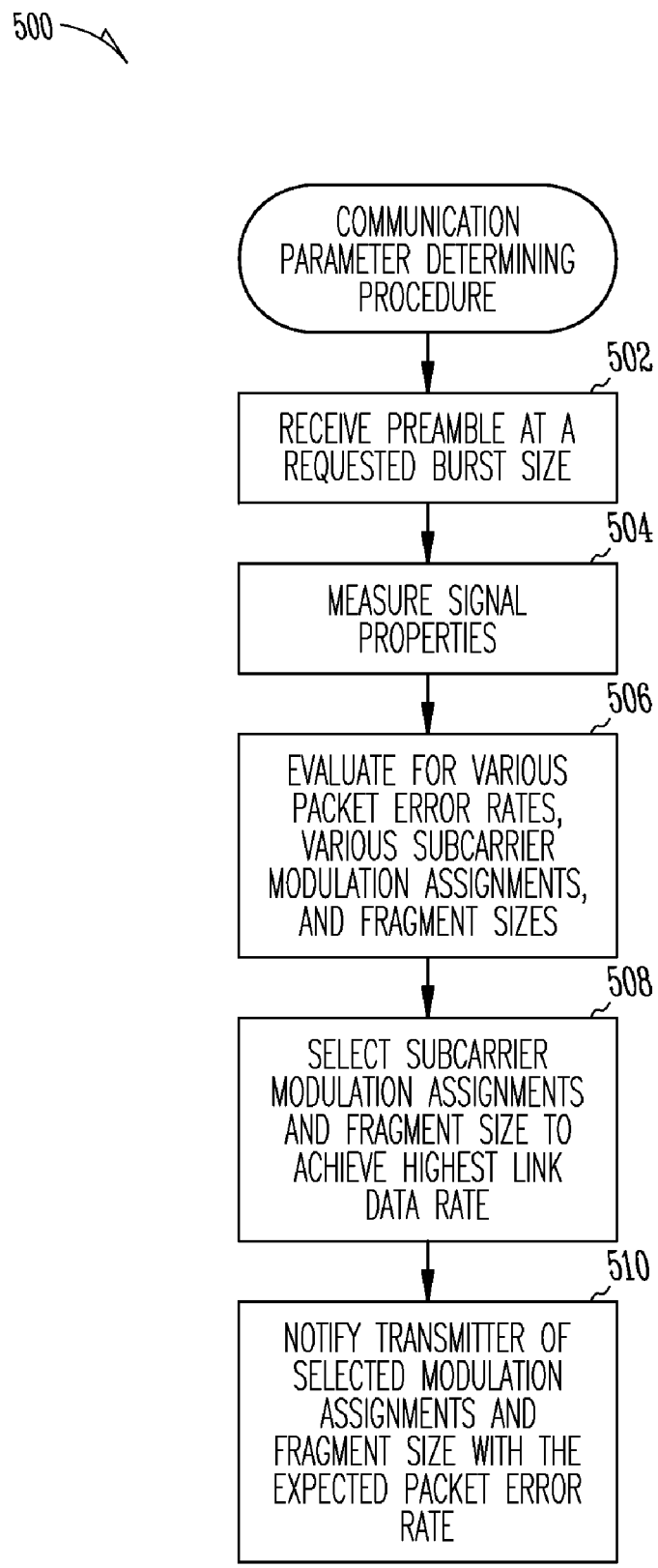
FIG. 5 is a flow chart of a procedure for determining communication parameters in accordance with some embodiments of the present invention.

FIG. 5 is a flow chart of a procedure for determining communication parameters in accordance with some embodiments of the present invention. Procedure 500 may be performed by one or more communication stations, such as communication stations 102 and 104 (FIG. 1) to determine communication parameters for communicating over a communication link using symbol-modulated subcarriers. The communication parameters may include subcarrier modulation assignments for individual subcarriers, as well as a transmit power level. Procedure 500 may be performed by a communication station to help determine and/or optimize throughput (e.g., link data rate) at a predetermined transmit power level for a given burst size.

In operation 502, a receiving station may receive a communication signal, such as a channel-sounding preamble, from a transmitting station. In some embodiments, the communication signal may be a request to send (RTS) communication, although the scope of the invention is not limited in this respect. The communication signal may carry a requested burst size and may be transmitted at a predetermined transmit power level.

In operation 504, the receiving station may measure the signal properties of the received signal, such as the signal-to-noise ratio during the preamble. In operation 506, the receiving station may evaluate for various packet error rates, various subcarrier modulation assignments and fragment sizes to determine potential link data rates. In operation 508, the receiving station may select one of the potential subcarrier modulation assignments and a fragment size based on the potential link data rate to achieve a link data rate. In some embodiments, the receiving station may select one of the potential subcarrier modulation assignments and a fragment size based on the potential link data rate to achieve the highest link data rate. In some embodiments, operation 508 may comprise estimating a duration of a data burst and a number of bytes expected to be received without error (e.g., the goodput) to determine an estimated link data rate. In these embodiments, the receiving station may select a combination of packet error rate and fragment size to achieve a highest link data rate.

Operation 510 may comprise transmitting the selected subcarrier modulation assignments and the selected fragment size to a transmitting station. In some embodiments, operation 510 may also include transmitting an expected packet error rate to the transmitting station. Upon the completion of operation 510, the receiving station may receive subsequent communications from the transmitting station in accordance with the selections.

Although the individual operations of procedures 400 and 500 are illustrated and described as separate operations, one or more of the individual operations may be performed concurrently and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waver, infrared signals, digital signals, etc.), and others.

It is emphasized that the Abstract is provided to comply with 37 C. F. R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method comprising:
    selecting a transmit power level and subcarrier modulation assignments based on measured channel conditions to achieve a performance level for communications over a symbol-modulated subcarrier communication channel;
    determining at least one of a desired packet error rate and a desired link data rate based on the performance level desired for an application and a data type; and
    determining whether to change the transmit power level depending on whether the at least one of the desired packet error rate and the desired link data rate can be achieved based on the selected subcarrier modulation assignments and the selected transmit power level.

2. The method of claim 1 further comprising generating at least one of an estimated packet error rate and an estimated link data rate for the channel based on the selected subcarrier modulation assignments and the selected transmit power level, and
    wherein the determining whether to change the transmit power level is based on a comparison between the at least one of the estimated packet error rate and link data rate, and the at least one of the desired packet error rate and the desired link data rate.

3. The method of claim 2 wherein the selecting the subcarrier modulation assignments and the generating the at least one of the estimated packet error rate and the estimated link data rate are performed by a receiving station, and
    wherein the method further comprises requesting, by the receiving station, a transmitting station to change the transmit power level based on the desired packet error rate and the desired link data rate.

4. The method of claim 3 further comprising:
    refraining, at the transmitting station, from increasing the transmit power level based on at least one of either network considerations, interference considerations or power consumption considerations;
    reselecting the subcarrier modulation assignments to achieve a quality of service level; and
    communicating the re-selected selecting subcarrier modulation assignments to the receiving station.

5. The method of claim 1, wherein the determining the at least one of the desired packet error rate and the desired link data rate is based on whether the data type comprises voice, audio, video, gaming, internet protocol, file transfer or email data.

6. The method of claim 5 wherein the determining the at least one of the desired packet error rate and the desired link data rate further comprises determining the desired packet error rate and the desired link data rate based on a desired quality of service level for the application using data of the data type.

7. The method of claim 1 further comprising:
    decreasing the transmit power level to less than a maximum power level for an application that meets a predetermined quality of service level with data having at least one of a low desired data rate or a high permitted packet error rate; and
    communicating at the decreased transmit power level at either a lowered link data rate selected to substantially achieve the desired packet error rate, or at an increased packet error rate selected to substantially achieve the desired link data rate.

8. The method of claim 1 further comprising:
    measuring channel conditions of at least one other communication channel; and refraining from increasing the transmit power level when an increased transmit power level would cause an unacceptable level of interference with other communication devices based on the measured channel conditions of the at least one other communication channel.

9. The method of claim 1 further comprising increasing the transmit power level to achieve at least one of a decreased the packet error rate or an increased the link data rate to substantially meet a quality of service level for the application and the data type.

10. The method of claim 1 further comprising:
refraining from increasing the transmit power level; and
either communicating at a lowered link data rate selected to substantially achieve the desired packet error rate, or communicating at a reduced packet error rate selected to substantially achieve the desired link data rate.

11. A method comprising selecting a transmit power level and subcarrier modulation assignments based on measured channel conditions to achieve a performance level for communications over a symbol-modulated subcarrier communication channel,
wherein the communication channel comprises a plurality of individual symbol-modulated subcarriers, and wherein the selecting comprises selecting modulation rates for the individual subcarriers based on the measured channel conditions,
wherein the selecting the subcarrier modulation assignments comprises selecting the subcarrier modulation assignments for the individual subcarriers based on a received signal, and
wherein the method further comprises receiving data packets comprising data and training symbols modulated in accordance with the selected subcarrier modulation assignments over the plurality of subcarriers, the data packets transmitted at the selected transmit power level.

12. The method of claim 11 wherein the selecting the subcarrier modulation assignments comprises selecting one of no modulation, BPSK modulation, QPSK modulation, 8-PSK modulation, 16-QAM, 32-QAM, 64-QAM, 128-QAM and 256-QAM for the individual subcarriers of the communication channel.

13. A method comprising:
receiving a communication signal transmitted at a predetermined transmit power level carrying packets in a burst of predetermined size;
evaluating based on characteristics of the received communication signal for various packet error rates, various subcarrier modulation assignments and fragment sizes to determine potential link data rates; and
selecting one of the subcarrier modulation assignments and fragment sizes based on the potential link data rate to achieve a desired link data rate.

14. The method of claim 13 wherein:
the receiving the communication signal comprises receiving the communication signal transmitted at the predetermined transmit power level carrying packets having one of either a requested or a predetermined burst size; and
the evaluating comprises evaluating the various subcarrier modulation assignments and fragment sizes based on measured conditions of a communication channel through which the communication signal is received.

15. The method of claim 13 wherein:
the evaluating further comprises estimating a duration of a data burst and a number of bytes expected to be received without error to determine an estimated link data rate, and
wherein the selecting further comprises selecting a combination of packet error rate and fragment size to achieve a highest link data rate.

16. The method of claim 13 further comprising:
transmitting the selected subcarrier modulation assignments, the selected fragment size and an expected packet error rate to a transmitting station; and
receiving subsequent communications from the transmitting station in accordance with the selections.

17. The method of claim 13 wherein the communication signal is received through a communication channel comprising a plurality of individual symbol-modulated subcarriers, and wherein the selecting comprises selecting modulation rates for the individual subcarriers based on the measured conditions of the communication channel.

18. The method of claim 17 wherein the selecting the subcarrier modulation assignments comprises selecting at least one of no modulation, BPSK modulation, QPSK modulation, 8-PSK modulation, 16-QAM, 32-QAM, 64-QAM, 128-QAM and 256-QAM for the individual subcarriers of the communication channel,
wherein individual subcarriers having a better channel response are assigned higher-order modulation assignments having more bits per symbol, and
wherein subcarriers having a worse channel response are assigned lower-order modulation assignments having less bits per symbol.

19. An apparatus comprising:
an application controller to determine a desired performance level for an application and data type;
a physical layer to select a transmit power level and subcarrier modulation assignments for receipt of data over a communication channel at the desired performance level; and
a network controller to determine, a desired packet error rate and a link data rate based on the desired performance,
wherein the network controller is to further determine whether to change the transmit power level for subsequent communications over the communication channel depending on whether the desired packet error rate and link data rate can be achieved based on the selected subcarrier modulation assignments and the selected transmit power level.

20. The apparatus of claim 19 wherein the network controller is to estimate a packet error rate and a link data rate for the channel based on the selected subcarrier modulation assignments and the selected transmit power level,
wherein network controller is to further determine whether to change the transmit power level is based on a difference between the estimated packet error rate and link data rate, and the desired packet error rate or desired link data rate, and
wherein the network controller is to further determine the desired packet error rate and the desired link data rate based on whether the data type comprises one of voice, audio, video, gaming, internet protocol, file transfer or email data.

21. The apparatus of claim 20 wherein the communication channel comprises a plurality of individual symbol-modulated subcarriers, and wherein the network controller is to select modulation rates for the individual subcarriers based on the measured channel conditions, and
wherein the subcarrier modulation assignments comprise one of no modulation, BPSK modulation, QPSK modulation, 8-PSK modulation, 16-QAM, 32-QAM, 64-QAM, 128-QAM and 256-QAM for the individual subcarriers of the communication channel.

22. A system comprising:
a omnidirectional antenna to receive communications over a symbol-modulated subcarrier communication channel;
a physical layer coupled with the antenna to select a transmit power level and subcarrier modulation assignments based on channel conditions to achieve a performance level;
an application controller to determine the performance level based on an application and data type; and
a network controller to determine at least one of a desired packet error rate and a desired link data rate based on the performance level desired for the application and the data type,
wherein the network controller is to further determine whether to change the transmit power level for subsequent communications over the communication channel depending on whether the at least one of the desired packet error rate and the desired link data rate can be achieved based on the selected subcarrier modulation assignments and the selected transmit power level.

23. The system of claim 22 wherein:
the network controller is to instruct a transmitting station to decrease the transmit power level to less than a maximum power level for an application that meets a predetermined quality of service level with data having at least one of a low data rate data or a high packet error rate, and
the transmitting station is to communicate at the decreased transmit power level at either a lowered link data rate selected to substantially achieve the desired packet error rate, or at an increased packet error rate selected to substantially achieve the desired link data rate,
wherein the network controller is to refrain from instructing the transmitting station to increase the transmit power level when an increased transmit power level would cause an unacceptable level of interference with other communication devices based on measured channel conditions of the at least one other communication channel.

24. A computer-readable medium that stores instructions for execution by one or more processors which cause said processors to perform operations comprising:

selecting a transmit power level and subcarrier modulation assignments based on measured channel conditions to achieve a performance level for communications over a symbol-modulated subcarrier communication channel;
determining at least one of a desired packet error rate and a desired link data rate based on the performance level desired for an application and a data type;
determining whether to change the transmit power level depending on whether the at least one of the desired packet error rate and the desired link data rate can be achieved based on the selected subcarrier modulation assignments and the selected transmit power level;
generating at least one of an estimated packet error rate and an estimated link data rate for the channel based on the selected subcarrier modulation assignments and the selected transmit power level,
wherein the determining whether to change the transmit power level is based on a comparison between the at least one of the estimated packet error rate and link data rate, and the at least one of the desired packet error rate and the desired link data rate,
wherein the determining the at least one of the desired packet error rate and the desired link data rate is based on whether the data type comprises voice, audio, video, gaming, internet protocol, file transfer or email data, and
wherein the determining the at least one of the desired packet error rate and the desired link data rate further comprises determining the desired packet error rate and the desired link data rate based on a desired quality of service level for the application using data of the data type.

25. The computer-readable medium of claim 24 wherein the communication channel comprises a plurality of individual symbol-modulated subcarriers, and wherein the selecting comprises selecting modulation rates for the individual subcarriers based on the measured channel conditions, and
wherein the selecting the subcarrier modulation assignments comprises selecting one of no modulation, BPSK modulation, QPSK modulation, 8-PSK modulation, 16-QAM, 32-QAM, 64-QAM, 128-QAM and 256-QAM for the individual subcarriers of the communication channel.

* * * * *

UNITED STATES PATENT AND TRADEMARK OFFICE
CERTIFICATE OF CORRECTION

PATENT NO. : 7,321,614 B2 Page 1 of 1
APPLICATION NO. : 10/675892
DATED : January 22, 2008
INVENTOR(S) : Jacobsen et al.

It is certified that error appears in the above-identified patent and that said Letters Patent is hereby corrected as shown below:

In column 14, line 41, in Claim 19, after "determine" delete ",".

Signed and Sealed this

Twenty-seventh Day of May, 2008

JON W. DUDAS
*Director of the United States Patent and Trademark Office*